(12) United States Patent
Harrington et al.

(10) Patent No.: US 8,122,113 B2
(45) Date of Patent: Feb. 21, 2012

(54) DYNAMIC HOST CONFIGURATION PROTOCOL (DHCP) MESSAGE INTERCEPTION AND MODIFICATION

(75) Inventors: Kendra S. Harrington, Irvine, CA (US); Allen J. Huotari, Garden Grove, CA (US)

(73) Assignee: Cisco Technology, Inc., San Jose, CA (US)

( * ) Notice: Subject to any disclaimer, the term of this patent is extended or adjusted under 35 U.S.C. 154(b) by 267 days.

(21) Appl. No.: 11/859,415

(22) Filed: Sep. 21, 2007

(65) Prior Publication Data

US 2009/0083406 A1    Mar. 26, 2009

(51) Int. Cl.
*G06F 15/177* (2006.01)
(52) U.S. Cl. ............. 709/222; 709/203; 709/220; 713/2
(58) Field of Classification Search .......... 709/203, 709/227, 222, 220; 370/230, 389, 338, 254, 370/392; 713/2
See application file for complete search history.

(56) References Cited

U.S. PATENT DOCUMENTS

| | | | | |
|---|---|---|---|---|
| 6,058,421 | A * | 5/2000 | Fijolek et al. ................. | 709/203 |
| 6,697,360 | B1 * | 2/2004 | Gai et al. ...................... | 370/389 |
| 6,871,210 | B1 * | 3/2005 | Subramanian ................ | 709/203 |
| 7,068,597 | B1 * | 6/2006 | Fijolek et al. ................. | 370/230 |
| 7,337,224 | B1 * | 2/2008 | Van Horne et al. ........... | 709/225 |
| 7,356,009 | B1 * | 4/2008 | Meier et al. .................... | 370/338 |
| 2006/0056630 | A1 * | 3/2006 | Zimmer et al. ................ | 380/256 |
| 2006/0114894 | A1 * | 6/2006 | Cherchali et al. ............ | 370/389 |
| 2007/0049265 | A1 * | 3/2007 | Kaimal et al. ................ | 455/423 |
| 2007/0214270 | A1 * | 9/2007 | Absillis ........................ | 709/227 |
| 2008/0209196 | A1 * | 8/2008 | Hernandez et al. ............. | 713/2 |
| 2008/0209197 | A1 * | 8/2008 | Hernandez et al. ............. | 713/2 |
| 2009/0245132 | A1 * | 10/2009 | Beser .............................. | 370/254 |

OTHER PUBLICATIONS

Texas Instrument. AR7 ADSL Network Support Package (NSP). Texas Instrument, 2006. Print.*
"Wi-Fi Certified™ for Wi-Fi Protected Setup: Easing the User Experience for Home and Small Office Wi-Fi® Networks", 2007, Wi-Fi Alliance, pp. 1-14.
Bill Croft and John Gilmore, "RFC 951 Bootstrap Protocol", Updated by 1395, 1497, 1532, 1542 Draft Standard Errata, Sep. 1985, pp. 1-11.
R. Droms, "Dynamic Host Configuration Protocol", Mar. 1997, pp. 1-41.

* cited by examiner

*Primary Examiner* — Wing Chan
*Assistant Examiner* — Hitesh Patel
(74) *Attorney, Agent, or Firm* — Haynes and Boone, LLP (57) ABSTRACT

In an embodiment, a method includes intercepting a configuration message from a first network node addressed to a third network node, and modifying the intercepted configuration message to provide a modified configuration message that includes address information associated with a second network node that is configured to provide bootstrap information for the third node.

17 Claims, 4 Drawing Sheets

DYNAMIC HOST CONFIGURATION PROTOCOL (DHCP) MESSAGE INTERCEPTION AND MODIFICATION

TECHNICAL FIELD

The present disclosure relates generally to electronic communications over a network.

BACKGROUND

Through the dynamic host configuration protocol (DHCP), a network device or client may discover the existence of a bootserver (also known as a bootstrap server) for use in its bootstrap configuration processes. One portion of IETF-RFC 2131 includes the following description: "DHCP clarifies the interpretation of the 'siaddr' field as the address of the server to use in the next step of the client's bootstrap process. A DHCP server may return its own address in the 'siaddr' field, if the server is prepared to supply the next bootstrap service (e.g., delivery of an operating system executable image). A DHCP server always returns its own address in the server identifier "option."

Commonly, there are instances where the "next" bootserver is added to a network (e.g., a home network) where there is no possibility for the end user to modify the behavior of the DHCP server. This may be because the DHCP server is in the service provider network or is integrated within the residential gateway/router without any access to configurable advanced options, or because it is undesirable or impractical to permit a user to modify the DHCP server behavior. Therefore, there remains a need for providing bootstrap information to a network device without modifying the existing network host or DHCP server.

DESCRIPTION

Overview

One example method for dynamic host configuration protocol (DCHP) message interception and modification comprises first intercepting a configuration message from a first network node addressed to a third network node. The intercepted configuration message is modified to provide a modified configuration message that includes address information associated with a second network node that is configured to provide bootstrap information for the third network node.

Description of Example Embodiments

Figure 1:
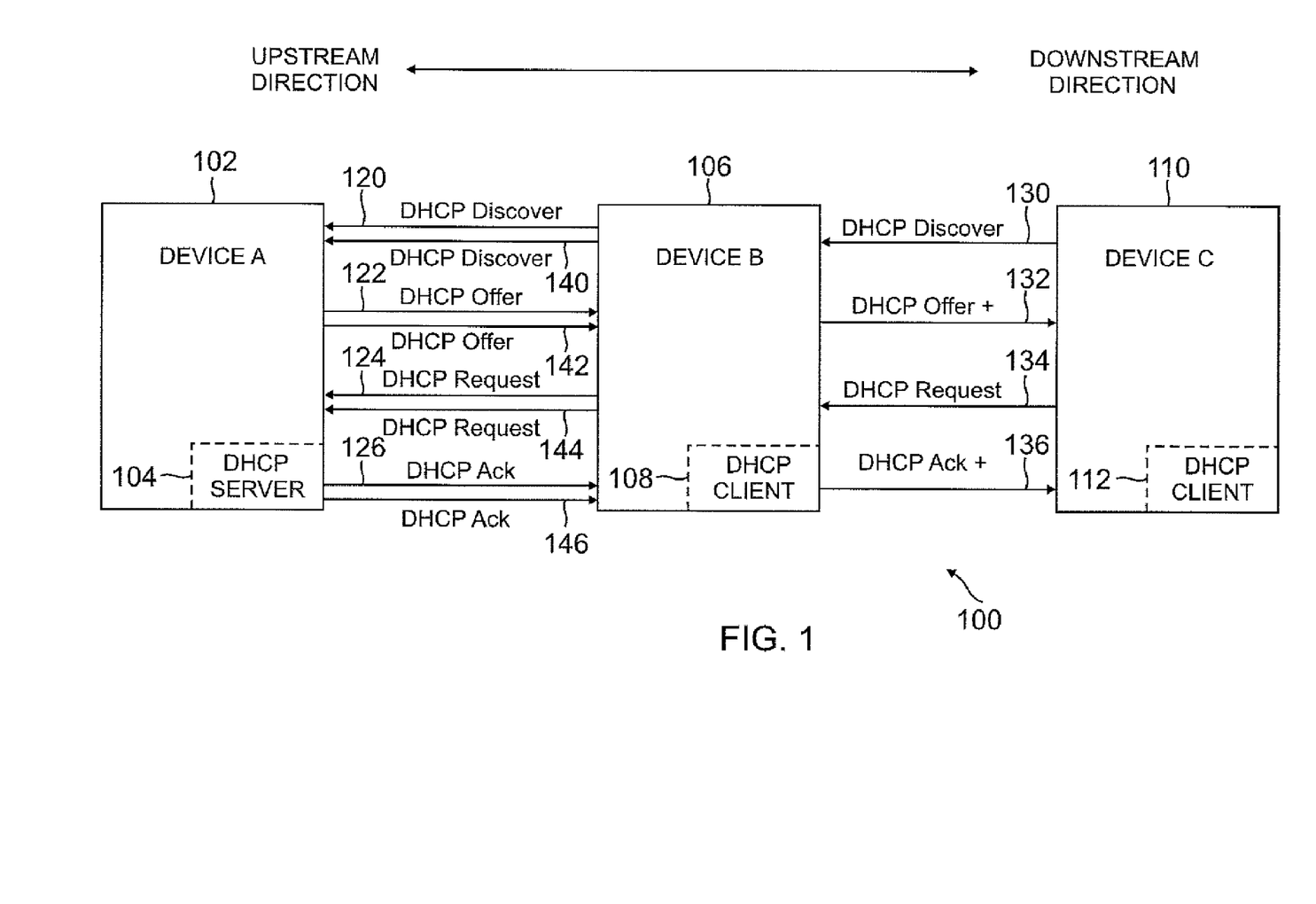
FIG. 1 shows a block diagram view of an example serial network, according to an embodiment.

FIG. 1 is a block diagram of an example serial network 100, according to an embodiment. Serial network 100 may include a first network device 102 having a dynamic host configuration protocol (DHCP) server 104, a second network device 106 having a first DHCP client 108, and a third network device 110 having a second DHCP client 112. First device 102, second device 106, and third device 110 are serially connected, with second device 106 disposed between first device 102 and third device 110 so that third device 110 does not have direct access to first device 102. That is, first device 102 and third device 110 are not in direct communication with each other, and must use at least one intermediate node to exchange configuration messages. Each DHCP device (102, 106, 110) may be any type of network device capable of communications as herein described.

Each DHCP device (102, 106, 110) may include either a DHCP server (104) or a client (108, 112) that supports a framework for providing configuration parameters between Internet hosts including a method of delivering host-specific configuration parameters, and a mechanism for allocating network addresses to network hosts. DHCP is described by a document entitled "Dynamic Host Configuration Protocol", which is referenced as Internet Engineering Task Force (IETF) Request For Comments (RFC) 2131 (IETF-RFC 2131), the content of which is hereby incorporated by reference. As used herein, a DHCP client is an Internet host or network node that is configured to use DHCP to obtain configuration parameters such as a network address, and a DHCP server is an Internet host that is configured to return configuration parameters to a DHCP client. However, a DHCP client and server are not limited to these.

Typically, one host in a network is configured as a DHCP server, and client devices added to the network will automatically request parameters from the corresponding server. In one example negotiation for DHCP parameters, second device 106, as a first client, may be added to network 100 and may broadcast a configuration message, such as a DHCP Discover message 120 to first device 102 as a DHCP server. First device 102 may respond with a DHCP Offer message 122, including an offer of configuration parameters. Second device 106 may receive the DHCP Offer and assert a DHCP Request message 124. First device 102 may then respond with a DHCP Ack message 126 including the requested parameters. In this example transaction, the requested parameters from first (server) device 102 to second (client) device 106 may include an assigned network address and/or address lease information along with the name of a file to be loaded into memory and executed comprising configuration data for the requesting device. Similar to the above, third device 110, as a second client and being of a particular device type, may be added to network 100 having a direct connection with second device 106, but not a direct connection with first device 102. Second device 106 may be pre-programmed to respond to a request for configuration and configured to modify forwarded or generated DHCP Offer and Ack messages to identify the network location of a suitable bootserver for requesting devices like third device 110 having a predetermined device type.

In an example transaction, third device 110 may broadcast a DHCP Discover type or classification of third device 110 (for example, see IETF-RFC 2131, "DHCP Option 60"). Second device 106 may store information identifying the device type of third device 110 and may forward the DHCP Discover message 130 to first device 102 as a DHCP Discover message 140. First device 102 may receive DHCP Discover message 140 and respond with a DHCP Offer message 142, offering a network address from first device (DHCP server) 104 and, by default, offering bootstrap parameters, since first device 104 is not aware of the device type corresponding to third device 110. However, since second device 106 is aware third device 110 is requesting configuration information and third device 110 has a device type that corresponds to the predetermined device type, second device may forward DHCP Offer message 142 as a modified DHCP Offer+message 132, where identifying information is inserted into the message including the network address or location of a bootserver suitable to the client type of third device 110. This suitable bootserver and/or bootstrap information may reside in second device 106 itself, or may reside in another network node reachable from the network.

Once third device 110 receives the DHCP Offer+message 132, third device 110 may respond with a DHCP Request message 134 to second device 106, which may forward a corresponding DHCP Request message 144 to first device 102. In this manner, third device 110 may request at least a network address and other parameters from the DHCP server in first device 102. However, first device 102 may not include suitable configuration information for a device type corresponding to third device 110, and specifically may not include an operating system readable image or computer image file suitable for third device 110. First device 102 may respond by asserting a DHCP Ack message 146 to second device 106, providing at least a network address and/or an address lease for third device 110. Since second device 106 is aware third device 110 is requesting configuration information and has a device type that corresponds to the predetermined device type, second device 106 may forward DHCP Ack message 146 as a modified DHCP Ack+message 136, where identifying information is inserted into the message including the network location of a bootserver suitable for the device type of third device 110.

In particular, the suitable bootserver may be capable of delivering an operating system executable image or a computer readable image file having bootstrap or startup information suitable for third device 110. In a traditional, serially-connected DHCP network, third device 110 could not seek or receive information about a "next" device that is configured as a bootserver, first device 102 having configuration parameters needed for boot service. In this manner, the boot device is not directly accessible from the requesting device. Once third device 110 receives the identifying information for the suitable bootserver, third device 110 may request the bootstrap information using the identifying information, such as an Internet Protocol (IP) address, a network address, and/or a domain name server (DNS) name corresponding to the suitable bootserver.

Figure 2:
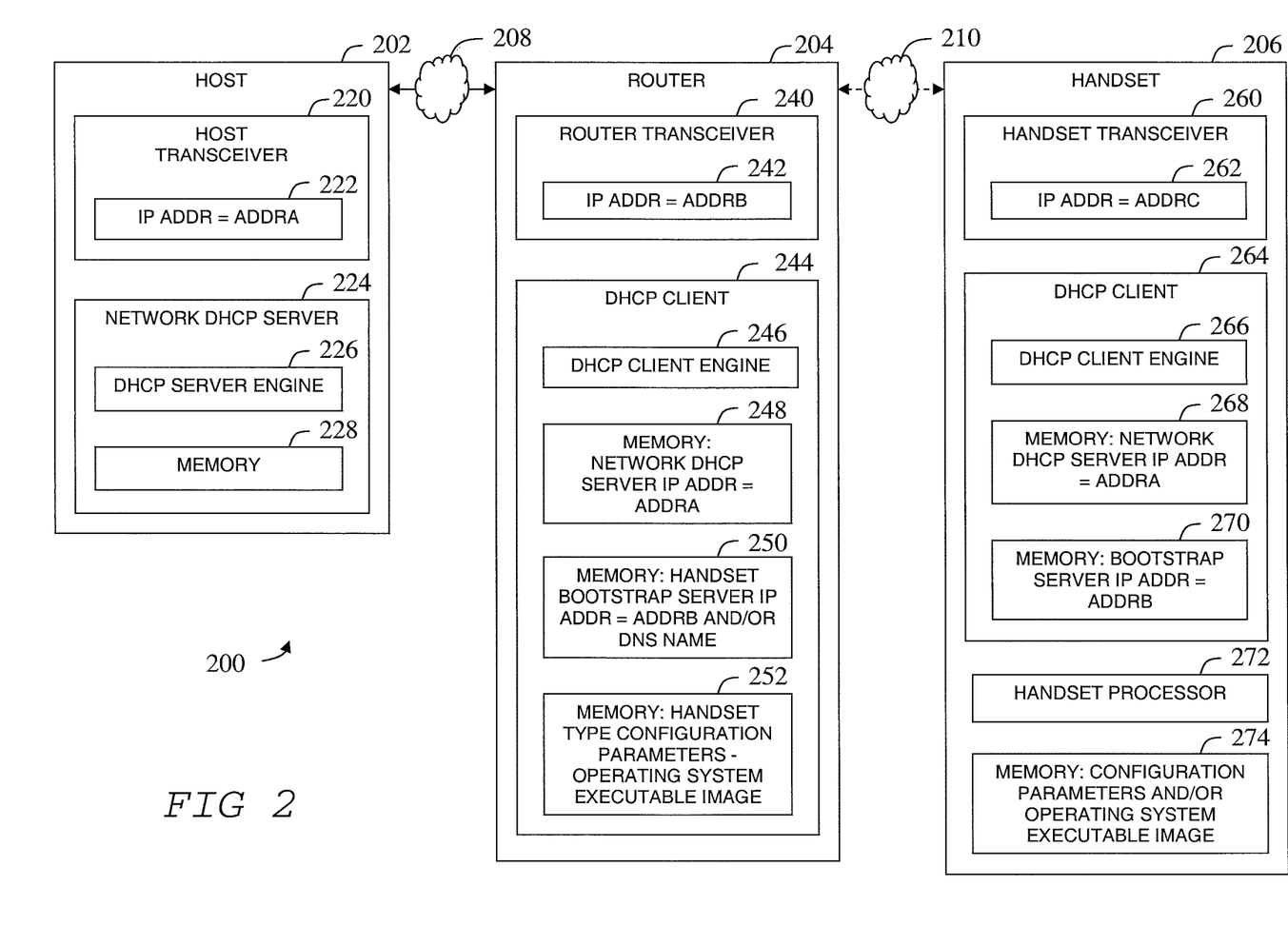
FIG. 2 shows a block diagram view of another example serial network, according to an embodiment.

FIG. 2 is a block diagram of another example serial network 200, according to an embodiment. Serial network 200 may include a host 202, a router 204, and a handset 206 connected serially. Host 202 may be connected to router 204 via a first network or network connection 208 that may include a wired connection, and router 204 may be connected with handset 206 via a second network or network connection 210 that may be a wired or a wireless connection, where handset 206 does not have a direct connection with host 202. In this manner, network 208 may be considered an upstream network, sub-network (sub-net), and/or connected to an upstream side of router 204. Similarly, network 210 may be considered a downstream network, sub-network (sub-net), and/or connected to a downstream side of router 204. In one example, handset 206 may be any wireless hand-held communications device for transmitting and/or receiving information using audio, video, and/or text message formats. Each device (202, 204, 206) may support configuration and parameter passing according to the dynamic host configuration protocol (DHCP) as either a client and/or a server, where a particular network node may be a client in one context and configured as a server in another context. Other device and network types may be used, so this is not considered limiting.

Host 202 may be a network resource such as a host or file server and include a host transceiver 220 having an Internet Protocol (IP) address ADDRA 222 or domain name server (DNS) name that uniquely identifies host 202 on network 208. In terms of the DHCP protocol, ADDRA 222 may be related to, or the same as, the "siaddr field" corresponding to an IP address of a next server to use in bootstrap operations, and may be returned as a part of a DHCP Offer message or DHCP Ack message by default, or when particular conditions are met. Host 202 may also include a network DHCP server 224 having a DHCP server engine 226 and a memory 228 configured to store and provide one or more configuration parameters. DHCP server engine 226 may be implemented using suitable hardware including a suitably programmed computer processor configured to execute computer instructions to provide signaling in support of DHCP. Suitable hardware may include input/output drivers and related hardware to transmit and/or receive signals on a network.

As those skilled in the art will appreciate, dynamic host configuration protocol (DHCP) is a set of rules that is used by communications devices in a network so as to allow a device like a computer to request and obtain an IP address. The IP address may be obtained from a DHCP server which maintains a list of such addresses that are available for assignment to network devices. A DHCP server may be a computer that is configured to perform such IP address assignment. A DHCP server engine may be a software application that is run on the DHCP server to provide such IP address assignment.

Router 204 may be a network gateway or bridge and may include a router transceiver 240 having connections to both first network 208 and second network 210. Router transceiver 240 may be implemented as two separate transceiver devices or as a single transceiver having independent ports since the upstream and downstream networks are separate. Router transceiver 204 may be specified on the upstream network by an IP address ADDRB 242 or a DNS name that is unique to first network 208 and may be considered a wide area network (WAN) address. Any suitable addressing and/or address translation scheme may be used. Router 204 may also include a DHCP client 244 having a DHCP client engine 246 and a memory 248 that is configured to store and provide information identifying address 222 of host 202 as a network DHCP server. DHCP client engine 246 may be implemented using suitable hardware, including a suitably programmed computer processor configured to execute computer instructions to provide signaling in support of DHCP. Suitable hardware may include input/output drivers and related hardware to transmit and/or receive signals on a network.

Handset 206 may be a hand-held communications device, such as a wireless IP phone and may include a handset transceiver 260 having a connection to second network 210. Handset transceiver 260 may be specified by an IP address ADDRC 262 that is unique to second network 210. Handset 206 may also include a DHCP client 264 having a DHCP client engine 266, a memory 268 configured to store and provide information identifying address 222 of host 202 as a network DHCP server, and a memory 270 configured to store and provide information identifying the address of the bootstrap server. DHCP client engine 266 may be implemented using suitable hardware including a suitably programmed computer processor configured to execute computer instructions to provide signaling in support of DHCP. Suitable hardware may include input/output drivers and related hardware to transmit and/or receive signals on a network. As an example, handset 206 may be a wireless, hand-held device configured for personal use. Alternatively, handset 206 may be a wireless device, such as a laptop computer or a personal digital assistant. In yet another embodiment, handset 206 may be a wired device having a direct or indirect connection to router 204, but no direct connection to host 202.

In one example, router 204 may be aware of the network location of a suitable bootserver for handset 206 and that router 204 may be configured to bridge or route network traffic between first network 208 and second network 210. For example, router 204 may be a wireless access point (a bridge), a broadband modem (a bridge) or a wireless gateway (a router). Router 204 may include a DHCP server that may be selectively enabled and/or disabled, and router 204 may acquire an IP address from the network using a standard protocol such as DHCP or Point-to-Point over Ethernet (PP-PoE), for example. The network connections herein should be considered to be media independent and may include any combination of Ethernet, Multimedia over Coax Alliance (MoCA), Household Powerline communications (HomePlug), Home Phoneline Networking Alliance (HomePNA), or any other network medium. Handset 206 may connect to router 204 through a wireless access point and/or another network device, while preserving the serial nature of communication between router 204 and handset 206, where handset 206 does not have direct access to first network 208.

In the following example scenarios, a device to be configured may be designated as handset 206, where the DHCP server for the hierarchical network may be in host 202. Router 204 may acquire an IP address from host 202 as a WAN IP address. In this example, router 204 may be in a bridging mode, or router 204 may be in a routing mode but without a DHCP server enabled. Alternatively, the entire network (208, 210) may be segmented into two routable subnets, but with only one DHCP server in host 202. If handset device 206 associates to router 204, handset 206 may also acquire an IP address from host 202. However, host 202, having no knowledge that router 204 may be a suitable bootserver for handset 206, may populate the siaddr field in DHCP responses with either its own address or a null value.

DHCP client 244 may also include a memory 250 configured to store and provide information identifying a suitable bootserver by IP address or DNS name. DHCP client 244 may also include a memory 252 configured to store and provide information including configuration parameters suitable for a device type corresponding to handset 206. In particular, memory 252 may include an operating system executable tailored for a device type corresponding to handset 206, so that handset 206 may perform initialization and/or bootstrapping operations. Other device types may be used. Both memories 250 and 252 may be located in another network device located elsewhere in the either networks 208 or 210 and may be located in another level of hierarchy accessible by handset 206 through network 210. Alternatively, the bootserver for handset 206 may be a fourth network node located elsewhere on the network or at a different level of a network hierarchy, where handset 206 may use the address information provided in the siaddr field to access the bootserver.

Figure 3:
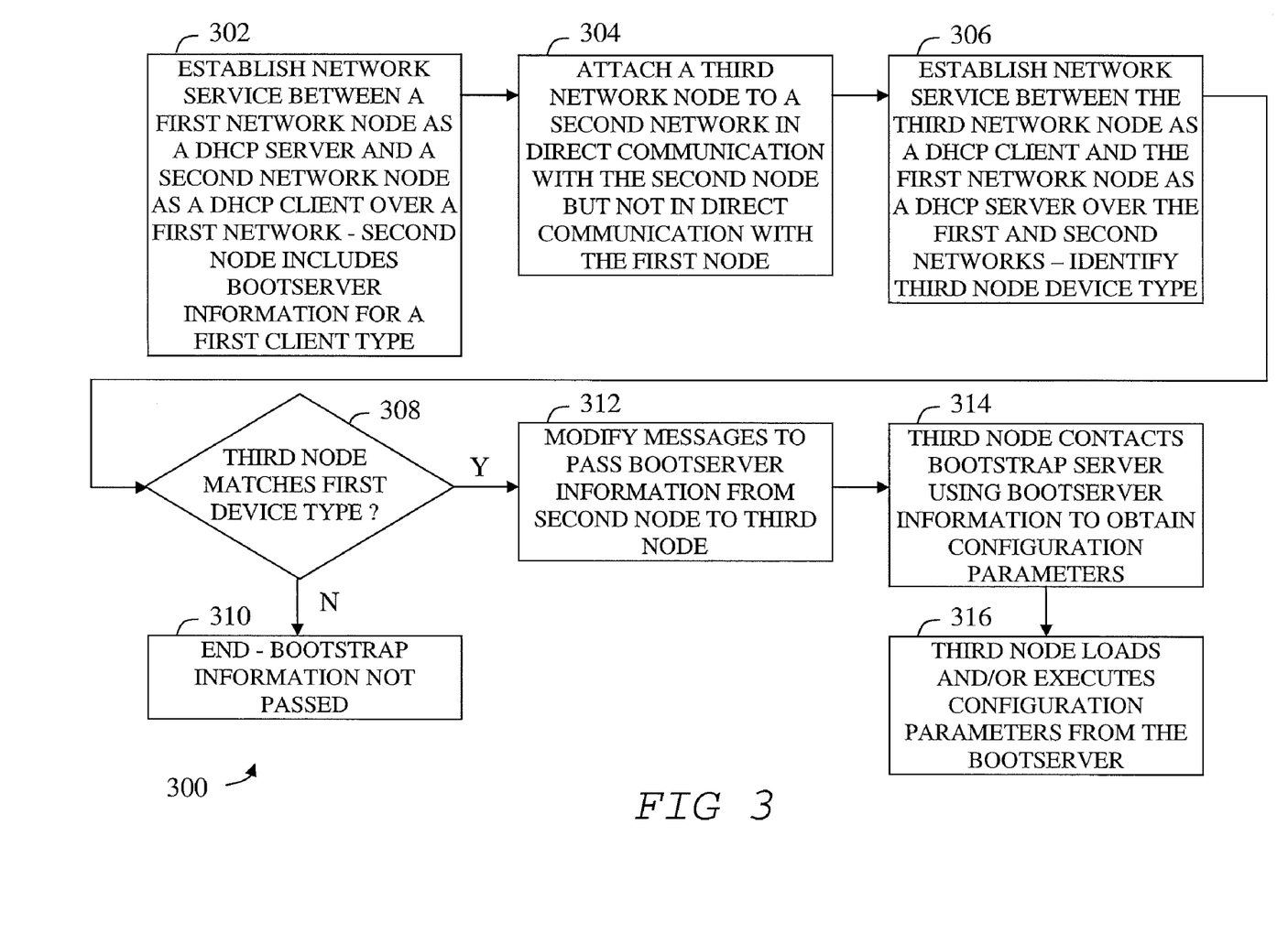
FIG. 3 shows an example bootstrap information passing flow, according to an embodiment.

FIG. 3 shows an example bootstrap information passing flow 300, according to an embodiment. In reference to FIGS. 1-3, flow 300 may include one or more operations and may begin with establishing network service between first network node 202 as a DHCP server and second network node 204 as a DHCP client over first network 208 in an operation 302. Note that nodes 202, 204, and 206 may correspond to the host, router, and handset, respectively, of FIG. 2. Establishing network service for second node 204 may include assigning a network address and/or providing a lease to second node 204 from first node 202. Second node 204 may include bootserver information for third node 206 having a particular client type.

In one example, third node 206 is a handset device type and second node 204 includes bootstrap configuration data 252 for the handset, but this is not considered limiting. Flow 300 may continue with attaching third network node 206 to second network 210 that is in direct communication with second node 204 but not in direct communication with the first node 202 in an operation 304. Flow 300 may continue with establishing network service between third node 206 as a DHCP client and first node 202 as a DHCP server over both the first and second networks (208, 210) and identifying the network device type of third node 206, in an operation 306. In this manner, network communication or traffic between first node 202 and third node 206 pass through second node 204, and second node 204 may store the identified device type for third node 206 at least temporarily. Establishing network service for third node 206 may include assigning a network address and/or providing a lease to third node 206 from first node 202.

During the process of establishing network service for third node 206, second node may evaluate whether the identified device type of third node 206 matches bootstrap configuration data 252 for third node 206 in an operation 308. Alternatively, bootstrap configuration data 252 may be available from another network node, and bootserver server information (e.g., address or DNS name) identifies a different network node from which suitable configuration data is available. If the results of the comparison in an operation 308 indicate a match is not made, then flow 300 ends with bootstrap information not passed in an operation 310. Alternatively, if the results of the comparison in operation 308 indicate a match is made, then the configuration data identified by second node 204 corresponds to the device type of third node 206, and flow 300 continues with modifying DHCP messages to pass bootserver information from second node 204 to third node 206 in an operation 312, comprising a message modification flow. While establishing network service for third node 206, information identifying the network address or DNS name of a suitable bootserver is passed to a device needing bootstrap configuration, without modifying the existing DHCP server and without requiring user intervention or interaction.

Once the information identifying the network address or DNS name of a suitable bootserver is passed to a device needing bootstrap configuration in operation 312, flow 300 may continue with third node 206 using the identified bootserver information to contact the suitable bootserver to obtain the configuration parameters in operation 314. In one example second node 204 is the suitable bootserver for node 206, and third node 206 contacts second node 204 to obtain configuration parameters. Once third node 206 obtains the configuration data from the bootserver, flow 300 concludes with third node 206 loading the configuration data as a part of the bootstrap or initialization in an operation 316.

Figure 4:
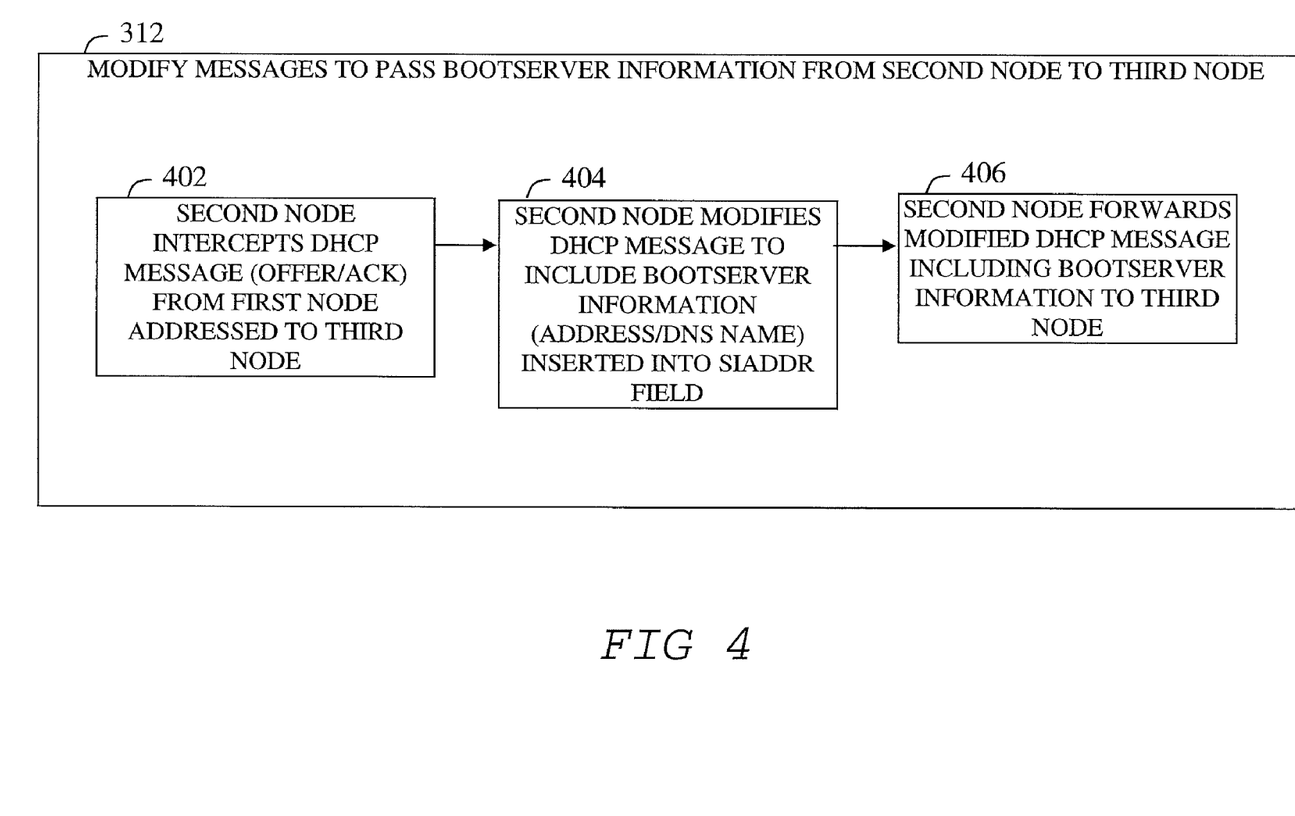
FIG. 4 shows an example message modification flow, according to an embodiment.

FIG. 4 shows an example message modification flow 312, according to an embodiment. In an embodiment, flow 312 may include second node 204 intercepting or receiving one or more DHCP messages (e.g., DHCP Offer and/or DHCP ACK) from first node 202 addressed to third node 206, in an operation 402. Flow 312 may continue with second node 204 modifying one or more of the intercepted DHCP message(s) to include bootserver information, such as by inserting a network address or DNS name into the siaddr field of a DHCP Offer/ACK message to identify the next bootserver, in an operation 404. When the same address information is inserted into two modified messages, the receiving device may validate the redundantly inserted address information. Finally, flow 312 may conclude with second node 204 forwarding or transmitting the one or more modified DHCP messages, including the bootserver information, to third node 206 in an operation 406. Alternatively, two different bootserver addresses may be supplied in operation 404, where a primary bootstrap address is supplied in modified DHCP Offer+message 132 and a secondary bootstrap address is supplied in modified DHCP Ack message 136. Both the primary and secondary bootserver address information may be stored in the receiving device, where the secondary bootserver address may provide an alternative source of bootstrap information when the primary bootserver is unavailable either during initial configuration or after a power-on event.

As shown in FIGS. 1-4, several example scenarios are possible. In a first example scenario, router 204 may intercept DHCP messages from host 202 and insert the router IP address into the siaddr field of messages to handset 206. In reference to FIGS. 1 and 2, downstream DHCP Offer+message 132 and DHCP Ack+message 136 may include information content, where the router IP address is inserted or substituted in the siaddr field. Alternatively, router 204 may intercept the DHCP message from handset 206 on its upstream path and subsequently insert its own IP address into the siaddr field for downstream messages when the intercepted messages DCHP Discover and/or DHCP Request indicate that handset 206 is requesting a bootserver IP address. In this manner, handset 206 may receive information regarding the network address or location of an appropriate bootserver while requesting another DHCP service, such as a network address assignment or lease. This technique may be used regardless of whether the IP address of router 204 is public or private, and where the bootserver address may be a domain name server (DNS) name rather than an IP address. Hence, an embodiment of the present invention may be in use when corresponding DHCP messages on an upstream side and a downstream side of a network device have different siaddr field information.

In one implementation, the siaddr field information for an intercepted DHCP message may be modified to identify a secondary or bootserver that may be used on the network via DHCP. After completing the original DHCP transaction, handset 206 may request bootstrap service via DHCP from the server identified as the next bootserver. In particular, handset 206 may establish a connection with router 204 to obtain bootstrap configuration parameters including an operating system executable image that may be retrieved and executed on a handset processor 272 and/or stored in an associated memory 274.

Although router 204 may forward DHCP requests from handset 206 to host 202 and forward DHCP responses from host 202 back to handset 206, such an operation described above encompasses more than bridging, since a simple bridge may transparently forward DHCP requests/responses without knowledge (e.g., inspection) of the content of the DHCP messages. While a DHCP relay may perform an intermediate function and modify a DHCP message by adding suboptions, a DHCP relay also removes (e.g., strips) any information sent downstream from a server to a client. In contrast, DHCP relay modifies messages that are not required to be augmented, while embodiments described herein do not strip information sent downstream from a server to a client.

In a second example scenario, the IP address of router 204 may be public and there may also be a DHCP server in router 204 that is capable of layer 3 forwarding (routing or NAT), in accordance with the well known Open System Interconnection (OSI) reference model for network communications. In this manner, layer 3 of the OSI reference model corresponds to a network layer, and layer-3 forwarding includes switching and routing technologies, transmitting data from node to node, and creating logical paths known as virtual circuits. In this case, handset device 206 acquires an IP address from router 204. Consequently, the second solution is for router 204 to populate the siaddr field with either the address that router 204 acquired from host 202 or to populate the siaddr field with its own private (e.g., LAN) address. In either case, handset 206 receives information that router 204 is the appropriate bootserver.

In a third example scenario, handset 206 associates to host 202 and acquires an IP address from host 202. In this example scenario, there is no opportunity to exploit the above solutions since router 204 is no longer disposed on the network path between host 202 and handset 206. Therefore, this third solution requires a modification to the DHCP server in host 202 and to the DHCP client in router 204. In this instance, the DHCP client in router 204 identifies itself, by using a new option, to the DHCP server in host 202 as being a bootserver for handset 206, and more generally for devices of the same type as handset 206. This may be accomplished with an option field from the client in router 204 that indicates to the server in host 202 "when devices of the same type as handset 206 request DHCP service from host 202, then insert the WAN IP address of router 204 into the siaddr field in messages from host 202". In this manner, router 204 may identify itself as being a bootserver that will service client identifiers of the type used by handset 206. Further, host 202 must accept this type of broadcast and/or advertisement. Scenario three may plug a security hole.

One or more of the above embodiments may include one or more enhancements. In one enhancement, handset 206 may be directed to an appropriate bootserver using beacons. That is, host 202 or router 204 may advertise the existence of a bootserver, which handset 206 may passively discover. Alternatively, handset 206 may actively discover the existence of a bootserver by issuing probe requests and examining the received probe responses from a suitable bootserver. In this case, two options may exist.

For the first option using a wireless network, router 204, as the bootserver itself, advertises or is discoverable via messaging that conforms to the Institute of Electrical and Electronics Engineers (IEEE) standard 802.11 for wireless local area networks (LANs). In this manner, handset 206 may receive information about the network location or address of an appropriate bootserver before associating and acquiring an IP address. As examples, an advertisement from router 204 may allow the first or second solution to be used since it forces handset 206 to connect with router 204. For the second instance, an access point may advertise that it knows or contains information about where an appropriate bootserver is located on the network, even though it is not the bootserver itself. This would be useful if the bootserver is not wireless and/or if there is no direct connection to the bootserver. In this case, an advertisement from host 202 may allow handset 206 to connect with host 202 and subsequently learn the location of router 204, the appropriate bootserver. In this and the above embodiments, there is no need for handset 206 and/or an equivalent device to be hard-coded with a bootserver address. That is, there is no need for the device seeking configuration to have a fixed address at which to acquire configuration parameters. This advantage may provide flexibility in providing service where hard-coding is not desirable or not possible.

The dynamic host configuration protocol (DHCP) assumes that the DHCP server has been provisioned by an administrator with predetermined information populated in the siaddr field, where there was previously no mechanism for the "next" bootserver to inform the DHCP server of a) its existence and b) when its address should be returned in siaddr for a specific client type. One or more embodiments describe a method and/or an apparatus for providing bootstrap information to a DHCP client device by intercepting, modifying, and forwarding configuration messages from the server to the client device.

According to an example embodiment, a method includes intercepting a configuration message from a first network node addressed to a third network node, and modifying the intercepted configuration message to provide a modified configuration message that includes address information associated with a second network node that is configured to provide bootstrap information for the third node.

According to another example embodiment, a method includes establishing network service between a first network node as a dynamic host configuration protocol (DHCP) server and a second node as a first DHCP client over a first network, the second node including bootserver address information for a predetermined client type, attaching a third network node as a second DHCP client to a second network in direct communication with the second node but not in direct communication with the first node, establishing network service between the third node and the first node over the first and second networks, the third node having a third node client type, the first node transmitting at least one DHCP configuration message to the third node, and modifying the at least one DHCP configuration message from the first node to the third node to provide bootserver information to the third node when the third node client type matches the predetermined client type.

According to another example embodiment, an apparatus includes a network transceiver configured to transmit and receive messages over a first network and a second network, the first network being separated from the second network and serially connected, the messages conforming to a dynamic host configuration protocol (DHCP) for exchange between a first network node on the first network, a second network node including the network transceiver, and a third network node on the second network, the third node being of a third node client type, and a memory in the second node configured to store and retrieve address information identifying a bootserver configured to provide bootstrap information for a network device having a predetermined client type, the memory being configured to store and retrieve client type information corresponding to a type of network device suitable for configuration using the bootstrap information, the address information comprising one of an Internet Protocol (IP) address or a domain name server (DNS) name, the address information being inserted into an intercepted message sent from the first node to the third node when the third node client type matches the predetermined client type.

According to another example embodiment, an apparatus includes a means for communicating by transmitting and receiving messages over a first network and a second network, the first network being separated from the second network, the messages conforming to a dynamic host configuration protocol (DHCP) for exchange between a first network node on the first network, a second network node including the communicating means, and a third network node on the second network, the third node being of a third node client type, and a means for storing and retrieving address information identifying a bootserver configured to provide bootstrap information for a device being of a predetermined client type, the storing and retrieving means being configured to store and retrieve client type information corresponding to a type of network device suitable for configuration using the bootstrap information, the address information comprising one of an Internet Protocol (IP) address or a domain name server (DNS) name, the address information being inserted into an intercepted message sent from the first node to the third node when the third node client type matches the predetermined client type.

Therefore, it should be understood that the invention may be practiced with modification and alteration within the spirit and scope of the appended claims. The description is not intended to be exhaustive or to limit the invention to the precise form disclosed. It should be understood that the invention may be practiced with modification and alteration and that the invention be limited only by the claims and the equivalents thereof.

What is claimed is:

1. A method, comprising:
    intercepting at a second network node a configuration message from a first network node that is a dynamic host configuration protocol (DHCP) server, the configuration message being addressed to a third network node that is a client device having a device type, wherein:
        the second network node is disposed between the first network node and the third network node so that the configuration message from the first network node DHCP server to the third network node client device passes through the second network node;
        the DHCP server is not aware of the device type of the third network node;
        the DHCP server does not have a bootserver address information suitable to devices having a predetermined device type;
        the bootserver address information for the predetermined device type is not included in the configuration message from the DHCP server;
        the second network node has the bootserver address information for the predetermined device type; and
        the second network node is aware of the device type of the third network node; and
    at the second network node, in response to the device type of the third network node matching the predetermined device type, the bootserver address information for the predetermined device type not being included in the configuration message from the DHCP server, and the second network node being aware that the device type of the third network node is the predetermined device type, modifying the intercepted configuration message from the DHCP server to provide for the third network node client device a modified configuration message, wherein the modified configuration message includes the bootserver address information for the predetermined device type, wherein the modified configuration message comprises a DHCP message and the DHCP message has a siaddr field, and wherein the siaddr field in the DHCP message is modified to include the bootserver address information.

2. The method of claim 1, further comprising forwarding from the second network node the modified configuration message to the third network node.

3. The method of claim 1, wherein the first network node and the third network node are not in direct communication with one another.

4. The method of claim 1, wherein the configuration message comprises a DHCP Offer message or a DHCP Ack message.

5. The method of claim 1, wherein the bootserver address information comprises an Internet Protocol (IP) address or a domain name server (DNS) name.

6. The method of claim 1, further comprising obtaining a bootstrap information from the second network node using the bootserver address information.

7. The method of claim 6, further comprising executing the bootstrap information in the third network node.

8. The method of claim 6, wherein the bootstrap information comprises a computer readable image file.

9. A method, comprising:
establishing communication over a first network between a first network node functioning as a dynamic host configuration protocol (DHCP) server and a second network node functioning as a first DHCP client, the second network node having a bootserver address information for a predetermined device type;
adding a third network node functioning as a second DHCP client to a second network that is in direct communication with the second network node, but not in direct communication with the first network node so that the configuration message from the first network node DHCP server to the third network node passes through the second network node;
establishing communication between the third network node and the first network node over the first and second networks,
the third network node having a third network node device type,
the DHCP server not being aware of the device type of the third network node;
the DHCP server not having the bootserver address information for devices having the predetermined device type;
the first network node transmitting a DHCP configuration message to the third network node;
the bootserver address information for the predetermined device type not being included in the configuration message from the DHCP server;
intercepting at the second network node the configuration message from the first network node, the configuration message being addressed to the third network node and wherein the second network node is aware of the device type of the third network node; and
at the second network node, in response to the device type of the third network node matching the predetermined device type, the bootserver address information for the predetermined device type not being included in the configuration message from the DHCP server, and the second network node being aware that the device type of the third network node is the predetermined device type, modifying the intercepted DHCP configuration message from the first network node DHCP server to the third network node to provide the bootserver address information for the predetermined device type to the third network node, wherein the modified DHCP configuration message has a siaddr field, and wherein the siaddr field in the modified DHCP configuration message includes the bootserver address information.

10. The method of claim 9, wherein the second network node is a bootserver for the third network node.

11. The method of claim 9, wherein the bootserver address information is not passed when the third network node device type does not match the predetermined device type.

12. The method of claim 9, further comprising:
contacting a bootserver using the bootserver address information, the bootserver having bootstrap information comprising a computer readable image file;
obtaining the bootstrap information from the bootserver; and
executing the bootstrap information.

13. The method of claim 9, wherein the first network node is a file server host as a DHCP server, the second network node is a router device configured as a first DHCP client, and the third network node is a handset device configured as a second DHCP client.

14. The method of claim 9, further comprising configuring a fourth network node as a bootserver for the third network node, the fourth network node not being disposed between the first network node and the second network node so that messages between the first network node and the third network node do not pass through the fourth network node, the fourth network node being accessible by the third network node using the bootserver address information.

15. A system, comprising:
a network transceiver configured to transmit and receive messages over a first network and a second network, wherein:
the first network is separated from the second network and the first network and the second network are serially connected so that a configuration message from a dynamic host configuration protocol (DHCP) server included in the first network to the second network passes through a second network node, the second network node including the network transceiver,
the configuration message conforms to DHCP for exchange between a first network node on the first network and a third network node on the second network, wherein:
the third network node is a device of a third network node device type;
the DHCP server is not aware of the device type of the third network node device;
the DHCP server does not have a bootserver address information suitable to devices having a predetermined device type; and
a memory in the second network node configured to store and retrieve the bootserver address information wherein:
the bootserver address information identifies a bootserver configured to provide bootstrap information for a network device having a predetermined device type,
the bootserver address information for the predetermined device type is not included in the configuration message from the DHCP server,
the bootserver address information comprises one of an Internet Protocol (IP) address or a domain name server (DNS) name,
the second network node is aware of the device type of the third network node device; and
in response to the device type of the third network node device matching the predetermined device type, the bootserver address information for the predetermined device type not being included in the configuration message from the DHCP server, and the second network node being aware that the device type of the third network node device is the predetermined device type, the bootserver address information not included in the configuration message from the DHCP server is inserted into the configuration message from the DHCP server, the configuration message from the DHCP server comprising a DHCP message having a siaddr field, the inserted bootserver information being inserted into the siaddr field, and the configuration message from the DHCP server being intercepted from the first network node and sent to the third network node.

16. The system of claim 15, wherein the bootserver address information is inserted into a siaddr field of at least one of a DHCP Offer message or a DHCP Ack message sent from the first network node to the third network node, the bootserver address information being used to contact the bootserver to obtain the bootstrap information, the bootstrap information comprising an operating system executable image file.

17. The system of claim 16, further comprising a processor configured to execute the operating system executable image file.

* * * * *